R. H. WHITE.
ENDLESS TRACK OF TRACK LAYING TRACTORS.
APPLICATION FILED SEPT. 12, 1917.
1,261,082.
Patented Apr. 2, 1918.
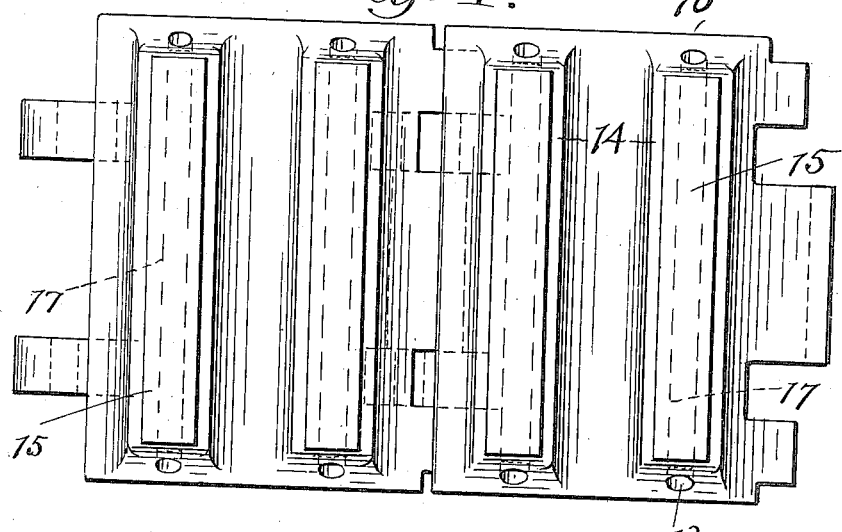
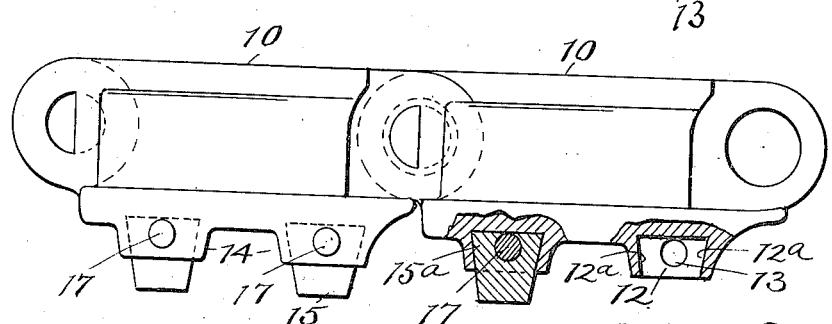
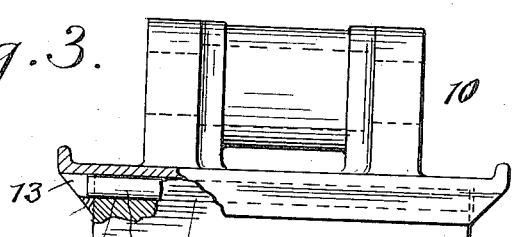
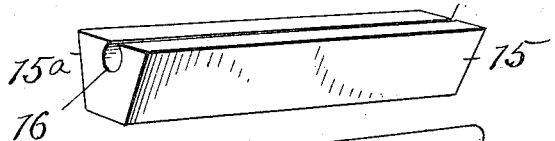
Inventor:
Rollin H. White
by Thurston Akers
attorney

UNITED STATES PATENT OFFICE.

ROLLIN H. WHITE, OF CLEVELAND HEIGHTS, OHIO, ASSIGNOR TO THE CLEVELAND TRACTOR COMPANY, OF CLEVELAND, OHIO, A CORPORATION OF OHIO.

ENDLESS TRACK OF TRACK-LAYING TRACTORS.

1,261,082.  Specification of Letters Patent.  Patented Apr. 2, 1918.

Application filed September 12, 1917. Serial No. 190,884.

*To all whom it may concern:*

Be it known that I, ROLLIN H. WHITE, a citizen of the United States, residing at Cleveland Heights, in the county of Cuyahoga and State of Ohio, have invented a certain new and useful Improvement in Endless Tracks of Track-Laying Tractors, of which the following is a full, clear, and exact description.

This invention relates to the endless belt-like tracks of a track laying tractor. These are essentially link belts modified to an extent necessary to enable them to perform the functions for which they are employed. It has been found necessary to provide the outer surfaces of the links of these traction belts with projecting ribs, because without them the tracks will slip on the ground and thereby fail to serve the purpose for which they are provided. This is because the tractors must be able to travel upon surfaces which are hard, or soft, or rough, or smooth as the case may be, and to take firm grip on such surfaces, or otherwise the track laying tractor is no more efficient than the less expensive wheel tractor.

Experience has shown that these ribs are rapidly worn and battered down to a degree that makes them become practically inefficient. To minimize this action and to provide relatively cheap means for repairing such damage, it is not uncommon to secure ribbed shoes to the outer surface of such traction links. These shoes are usually made of pressed steel on the theory that they will be better able to withstand the wear.

I have found, however, that in practice, the necessary traction on all kinds of surfaces can be secured by applying, to the outer faces of said track belt links, easily replaceable rubber tread blocks. On soft ground, the links so equipped take hold as effectively as do links provided with metal ribs, while on hard and uneven surfaces they are more efficient and substantially as durable. Their first cost is less, therefore, if efficient means are provided, by which to quickly apply and properly secure them to the links, the resultant structure will from every standpoint be much preferable.

The invention consists of the construction and combination of the parts which are shown in the drawing and are hereinafter described and definitely pointed out in the appended claims.

In the drawing, Figure 1 is a bottom view of two pivoted together links of the endless track of a track laying tractor constructed to embody this invention. Fig. 2 is a side elevation of the same two links, with a portion of one of them broken away and sectioned, and with one of the tread blocks absent. Fig. 3 is an end view of one of said links partly broken away and sectioned. Fig. 4 is a perspective view of one of the vulcanized rubber tread blocks; and Fig. 5 is a perspective view of the tread block locking pin.

Referring to the parts by reference characters, 10 represents one of the numerous links, which when pivoted together by any suitable or usual means, will form the endless track of a track laying tractor.

In the outer face of this traction member are one or more—in the present case two—transversely extended recesses 12. Each recess is long and narrow, and its ends are adjacent to the side edges of the link. The sides 12ª of each of these recesses are undercut as shown; and in the ends of each recess are the alined holes 13. It will be noted that each recess is in an outwardly projecting transversely extended rib 14, which if the hereinafter mentioned tread blocks by chance are pulled out, will in a large degree aid the track in firmly gripping the ground.

15 represents a vulcanized rubber tread block which is approximately key-stone shape in transverse section, the base portion, 15ª, being widest and being fitted to the recess 12.

A hole 16 extends longitudinally through each of these tread blocks from end to end and close to the bottom of the base thereof. A portion of the bottom wall of this hole is cut away, leaving the slot 16ª, through the base of the tread block leading to this hole.

17 represents the tread block locking pin. Because of the presence of the hole 16, and the slot 16ª, the base of the vulcanized tread block may be contracted to permit its insertion into the recess, 12, in which it will expand as shown.

Then the pin 17, is passed through one of the holes 13, and driven into and through the hole 16 in the tread block and then into the other hole 13. This locking pin is slightly larger in diameter than normal diameter of the hole 16; and, therefore, as it is driven through, it expands the base 15ª and makes it tightly fit in said recess. The rubber of the tread block tightly grips the pin and prevents its longitudinal movement, so that said pin will always remain with its ends projecting into the holes 13, of the traction member. The described construction, therefore, is such that one may readily secure the tread blocks in the recesses in the traction member or members in such wise that they may be securely held therein so long as it is desired to keep them there. When these tread blocks have been worn sufficiently to require renewal, it is not difficult to drive out the pins and remove the tread blocks.

When a track laying tractor, is used on very soft ground, or on unyielding surfaces such as floors, and hard pavement, or on very uneven surfaces,—in fact in nearly all its ordinary uses,—the rubber tread blocks will perform the functions for which they are provided much better than the metal ribs which heretofore have been used for the same purpose.

Having described my invention, I claim:

1. In the endless track of a track laying tractor, the combination of metal links pivoted together, said links having on their outer traction faces transversely extended recesses, the side walls of which are undercut and the end walls of which have alined holes in them, with a vulcanized rubber tread block, the base of which is fitted to said recess and has a longitudinal hole in it from end to end and a slot through its base leading to such hole and extending from end to end thereof, and a locking pin which is driven tightly through the hole in the tread block and at its ends projects into the holes in the end walls of the recess in which the base of said tread block is fitted.

2. In the endless track of a track laying tractor, the combination of a link thereof having in its outer surface a transversely extended narrow recess whose side walls are undercut, with a vulcanized rubber tread block having a base portion which is fitted to said recess and having a portion which projects out of said recess; said base portion of tread block having a hole which extends through it from end to end and having a slot through the lower wall of said hole and extending from one end to the other of said tread block, and a locking pin which is driven tightly into said hole, thereby expanding the base portion of said tread block and locking it in said recess.

3. In the endless track of a track laying tractor, the combination of a link thereof having in its outer surface a transversely extended narrow recess whose side walls are undercut and in whose end walls are alined holes, with a vulcanized tread block having a base portion which is fitted to said recess and having a portion which projects out of said recess; the so-embraced base portion of the tread block having a hole which extends through it from end to end and having a slot through the lower wall of said hole and extending from one end to the other of said tread block, and a locking pin which is driven tightly into said hole, thereby expanding the base portion of said tread block and locking it in said recess, the ends of said locking pin being projected into the two alined holes in the end walls of the recess.

In testimony whereof, I hereunto affix my signature.

ROLLIN H. WHITE.

Witnesses:
E. L. THURSTON,
E. B. GILCHRIST.